(12) United States Patent
Renzi

(10) Patent No.: US 6,918,573 B1
(45) Date of Patent: Jul. 19, 2005

(54) MICROVALVE

(75) Inventor: Ronald F. Renzi, Tracy, CA (US)

(73) Assignee: Sandia National Laboratories, Livermore, CA (US)

( * ) Notice: Subject to any disclaimer, the term of this patent is extended or adjusted under 35 U.S.C. 154(b) by 62 days.

(21) Appl. No.: 10/351,714

(22) Filed: Jan. 27, 2003

(51) Int. Cl.$^7$ .............................................. F16K 5/00
(52) U.S. Cl. ..................................... 251/304; 251/352
(58) Field of Search ............................... 251/304, 352

(56) References Cited

U.S. PATENT DOCUMENTS

| | | | |
|---|---|---|---|
| 3,476,138 A | * 11/1969 | Ellsworth et al. | 137/323 |
| 3,677,577 A | 7/1972 | Krauer et al. | 285/137 |
| 4,089,549 A | 5/1978 | Vyse et al. | 285/137 |
| 4,161,191 A | * 7/1979 | Ranger et al. | 137/625.46 |
| 4,915,419 A | 4/1990 | Smith, III | 285/26 |
| 4,995,646 A | 2/1991 | Johnston et al. | 285/137 |
| 5,209,525 A | 5/1993 | Ito | 285/137 |
| 5,366,620 A | 11/1994 | Schick | 210/198 |
| 5,419,208 A | 5/1995 | Schick | 73/863.73 |
| 5,472,598 A | 12/1995 | Schick | 210/198 |
| 5,482,628 A | 1/1996 | Schick | 210/198 |
| 5,487,569 A | 1/1996 | Silvis et al. | 285/24 |
| 5,494,641 A | 2/1996 | Krstanovic | 422/103 |
| 5,534,152 A | 7/1996 | Schick | 210/656 |
| 5,540,464 A | 7/1996 | Picha | 285/328 |
| 5,575,311 A | * 11/1996 | Kingsford | 137/625.5 |
| 5,644,395 A | 7/1997 | Folta | 356/246 |
| 5,736,036 A | 4/1998 | Upchurch et al. | 210/198 |
| 5,846,396 A | 12/1998 | Zanzucchi et al. | 204/601 |
| 5,855,229 A | 1/1999 | Gulf, Jr. | 137/884 |
| 5,865,474 A | 2/1999 | Takahashi | 285/124.1 |
| 5,987,735 A | 11/1999 | Horning et al. | 29/737 |
| 5,988,703 A | 11/1999 | Craig | 285/288.1 |
| 6,083,763 A | 7/2000 | Balch | 436/518 |
| 6,086,825 A | 7/2000 | Sundberg et al. | 422/100 |
| 6,090,251 A | 7/2000 | Sundberg et al. | 204/453 |

(Continued)

OTHER PUBLICATIONS

U.S. Appl. No. 10/350,541, filed Jan. 24, 2003, Renzi.

(Continued)

Primary Examiner—Edward K. Look
Assistant Examiner—John K. Fristoe, Jr.
(74) Attorney, Agent, or Firm—Fliesler Meyer LLP

(57) ABSTRACT

A high pressure microvalve for connecting a first fluid-bearing conduit to a second fluid-bearing conduit is provided. The microvalve includes (a) a first body having a first interior surface and at least one port outlet at the first interior surface that is in fluid communication with at least one first channel wherein each port outlet is surrounded by a first seal with an upper surface that is at a level above that of the first interior surface (b) a second body having a second interior surface and at least one port inlet at the second interior surface that is in fluid communication with at least one second channel, and wherein each port inlet is surrounded by a second seal with an upper surface that is at a level above that of the second interior surface, wherein the first interior surface is substantially planar and is slidably secured to the second interior surface which is also substantially planar, and (c) means for aligning a port outlet in the first body to a port inlet in the second body to permit fluid flow and/or control from a first channel into a second channel.

46 Claims, 1 Drawing Sheet

U.S. PATENT DOCUMENTS

| | | | |
|---|---|---|---|
| 6,102,449 A | 8/2000 | Welsh | 285/342 |
| 6,102,897 A | 8/2000 | Lang | 604/246 |
| 6,129,331 A | 10/2000 | Henning et al. | 251/11 |
| 6,190,616 B1 | 2/2001 | Jovanovich et al. | 422/103 |
| 6,224,728 B1 | 5/2001 | Oborny et al. | 204/450 |
| 6,267,143 B1 | 7/2001 | Schick | 137/625.11 |
| 6,293,725 B1 | 9/2001 | Winkvist | 403/282 |
| 6,312,960 B1 | 11/2001 | Balch et al. | 436/518 |
| 6,319,476 B1 | 11/2001 | Victor, Jr. et al. | 422/103 |
| 6,344,145 B1 | 2/2002 | Garguilo et al. | 210/635 |
| 6,358,387 B1 | 3/2002 | Kopf-Sill et al. | 204/603 |
| 2001/0045235 A1 | 11/2001 | Schick | |

OTHER PUBLICATIONS

U.S. Appl. No. 10/350,268, filed Jan. 24, 2003, Renzi.
U.S. Appl. No. 10/405,204, filed Apr. 2, 2003, Renzi.
U.S. Appl. No. 10/405,842, filed Apr. 2, 2003, Renzi et al.
U.S. Appl. No. 10/350,626, filed Jan. 24, 2003, Renzi.

\* cited by examiner

MICROVALVE

This invention was made with Government support under Contract No. DE-AC 04-94AL85000 awarded by the U.S. Department of Energy to Sandia Corporation. The Government has certain rights to the invention.

FIELD OF THE INVENTION

The present invention relates generally to microfluidic systems and more particularly to microvalves for controlling fluid flow in a capillary system. The microvalves can function as shut-off valves and/or divert valves.

BACKGROUND OF THE INVENTION

Devices for performing chemical analysis have in recent years become miniaturized. For example, microfluidic devices have been constructed using microelectronic fabrication and micromachining techniques on planar substrates such as glass or silicon which incorporate a series of interconnected channels or conduits to perform a variety of chemical analysis such as capillary electrophoresis (CE) and high-performance liquid chromatography (HPLC).

Microfluidic substrates have networks of chambers connected by channels which have mesoscale dimensions, where at least one dimension is usually between 0.1 microns and 500 microns. Such microfluidic substrates may be fabricated using photolithographic techniques similar to those used in the semi-conductor industry, and the resulting devices can be used to perform a variety of sophisticated chemical and biological analytical techniques. Microfluidic analytical technology has a number of advantages, including the ability to use very small sample sizes, typically on the order of nanoliters. The substrates may be produced at a relatively low cost, and can be formatted to perform numerous specific analytical operations, including mixing, dispensing, valving, reactions, and detections.

Another recently developed class of sample-receiving microfluidic substrates includes substrates having a capillary interface that allows compounds to be brought onto the test substrate from an external source, and which can be advantageously used in a number of assay formats for high-throughput screening applications. These assay formats include fluorogenic assays, fluorescence polarization assays, non-fluorogenic mobility shift assays, dose response assays, and calcium flux cell-based assays.

Other applications for microfluidic devices include diagnostics involving biomolecules and other analytical techniques such as micro total analysis systems. Such devices, often referred to in the art as "microchips," also may be fabricated from plastic, with the channels being etched, machined or injection molded into individual substrates. Multiple substrates may be suitably arranged and laminated to construct a microchip of desired function and geometry. In all cases, the channels used to carry out the analyses typically are of capillary scale dimension.

To fully exploit the technological advances offered by the use of microfluidic devices and to maintain the degree of sensitivity for analytical techniques when processing small volumes, e.g., microliters or less, it is critical to have microvalves that are capable of rapid (i)"on" and "off" actuation and/or (ii) diversion of fluid flow from one stream to another.

SUMMARY OF THE INVENTION

The invention is based in part on the development of a microvalve for connecting a first fluid-bearing conduit to a second fluid-bearing conduit. In one aspect, the invention is directed to a microvalve that includes:
    a first body having a first interior surface and at least one port outlet at the first interior surface that is in fluid communication with at least one first channel wherein each port outlet is surrounded by a first seal with an upper surface that is at a level above that of the first interior surface;
    a second body having a second interior surface and at least one port inlet at the second interior surface that is in fluid communication with at least one second channel wherein each port inlet is surrounded by a second seal with an upper surface that is at a level above that of the second interior surface, and wherein the first interior surface is substantially planar and is slidably secured to the second interior surface which is also substantially planar; and
    means for aligning a port outlet in the first body to a port inlet in the second body to permit fluid flow from a first channel into a second channel.

In another aspect, the invention is directed to a method of controlling the flow of fluid from a first fluid stream into a second fluid stream that includes the steps of:
    (a) providing a microvalve that comprises:
        (i) a first body having a first interior surface and at least one port outlet at the first interior surface that is in fluid communication with at least one first channel wherein each port outlet is surrounded by a first seal with an upper surface that is at a level above that of the first interior surface;
        (ii) a second body having a second interior surface and at least one port inlet at the second interior surface that is in fluid communication with at least one second channel wherein each port inlet is surrounded by a second seal with an upper surface that is at a level above that of the second interior surface, and wherein the first interior surface is substantially planar and is slidably secured to the second interior surface which is also substantially planar; and
        (ii) means for aligning a port outlet in the first body to a port inlet in the second body to permit fluid flow from a first channel into a second channel;
    (b) connecting a first channel to a port in the first body;
    (c) connecting a second channel to a port in the second body; and
    (d) maneuvering the aligning means to regulate fluid flow through the first and second channels.

The invention is directed to a microvalve device that can be employed, for instance, (i) as a shut-off valve or (ii) as a divert valve that channels flow from an inlet stream to two or more outlet streams. The microvalve device is particularly suited for use in microfluidic systems.

Figure 1:
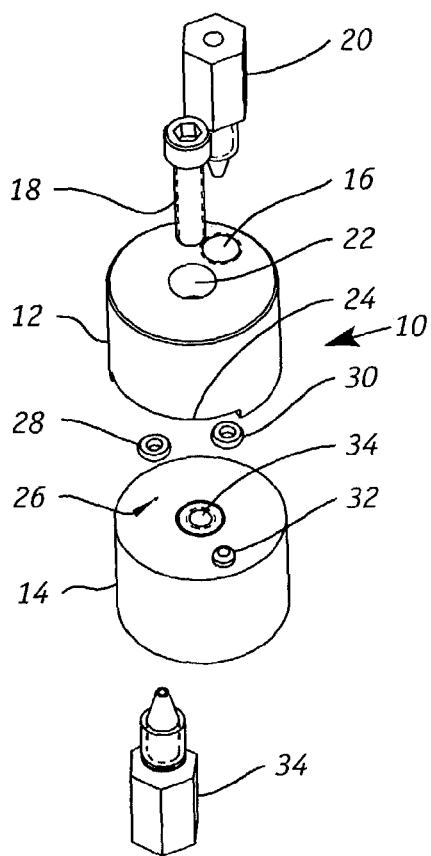
FIG. 1 is a perspective view of one embodiment of the dissembled microvalve.
Figure 2:
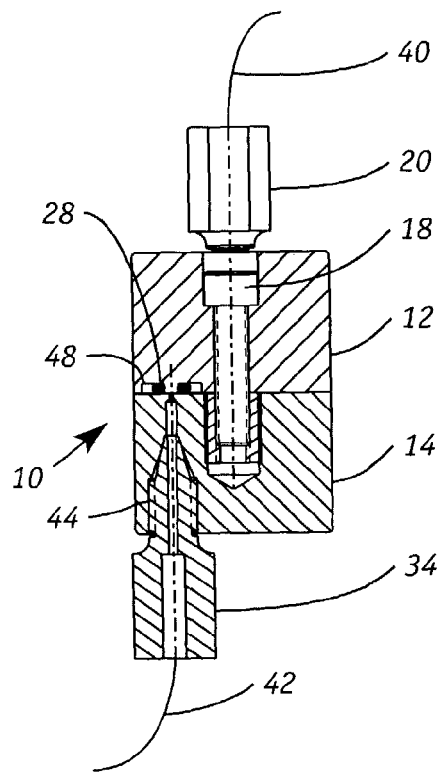
FIG. 2 is a cross sectional view of the assembled microvalve.

As illustrated in FIGS. 1 and 2, the microvalve 10 includes a first body 12 and a second body 14 each of which is preferably made of a metal, ceramic or a polymer material such as, for example, polyether ether ketone (PEEK), high density polyethylene, or polytetrafluoroethylene (PTFE). The first body 12 has at least one threaded conical-shaped cavity 16 that is designed to receive a threaded sealing ferrule 20. Similarly, the second body 14 has at least one threaded conical-shaped cavity 44 that is designed to receive a threaded sealing ferrule 34.

The first body 12 and/or the second body 14 may have more than one threaded conical-shaped cavity that is designed to receive a threaded sealing ferrule. The two bodies must have at least one cavity and accompanying ferrule but they do not otherwise need to have the same number of cavities and accompanying sealing ferrules. The number of cavities is determined by the function of the microvalve as further described herein.

Figure 3:
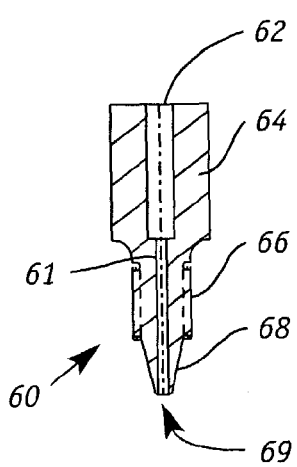
FIGS. 3–5 illustrate a one-piece ferrule.

As further shown in FIGS. 2 and 3, each sealing ferrule is provided with an internal cavity that runs the length of the ferrule to hold a capillary tube. Capillary tubes can be firmly but semi-permanently secured in both bodies by compression of the sealing ferrule. Moreover, the capillaries can be of different diameters and composed of different materials. In addition to holding a capillary tube, each sealing ferrule, formed from an easily deformable material such as PTFE, is used as a sealing device. The end of each sealing ferrule that is inserted into the receiving cavity is conical-shaped in order to provide a liquid-tight seal when the sealing ferrule is screwed into the cavity.

An opening in the mating surface of each body, e.g., port inlet 26 of the second body 14, that is concentric with the internal cavity of corresponding ferrule secured to the body, provides for fluid flow when the capillaries in both the first and second bodies are properly aligned to each other. Associated with opening 26 is concentric groove 48 in the first body 12 which holds an o-ring seal 28 that provides a fluid-tight seal between the mating surfaces of the two bodies under compressive loading. Polishing the mating surfaces of each body can also enhance the fluid-tight-seal. Similarly, an opening in the mating surface of the first body has associated therewith a groove which holds o-ring 30. O-rings can be fabricated from rubber, silicone or other suitable material.

The microvalve components are secured tightly with a bolt or screw 18 which is inserted through concentric holes 22 and 34 in the first and second bodies, respectively. In this fashion, the mating surfaces of the first and second bodies which face each other provide fluid-tight seals when compressive pressure is applied and maintained by the fastening means. Fastening means can also include a spring loaded bolt, spring loaded screw, clamp, electrically and activated solenoid.

To insure a good seal, the mating surfaces and first and second bodies that face each other should be planar and should be sufficiently polished. It has been demonstrated that by simply bolting the components of the microvalve together, the microvalve can be subjected to pressures of at least 500 psi without fluid leakage. The components of the microvalve can be secured also by screws that can be optionally spring loaded and/or other mechanical compressive devices.

A portion of the lower surface of first body 12 is removed to create an elevated annular ridge 24 that is bordered by left and right edges. To facilitate alignment or registration of the opening in the first body to that of the second body, the mating surface of second body 14 has a projection 32, shown in FIG. 1, thereon, e.g., dowel pin, that serves as a stop that engages an edge of ridge 24 to denote that the openings are properly aligned. Ridge 24 creates a space above projection 32 that permits free rotation of the first body within the space defined by the ridge. If there are more than two sets of openings on the mating surface of either or both of the first and second bodies, then alignment can also be accomplished with markings on the sides of the first and second bodies.

FIG. 3 shows a threaded ferrule 60 that is designed to be screwed into the conically-shaped cavities in first and second bodies 12, 14 of the microvalve as shown in FIG. 1. The ferrule includes an upper handle 64, an externally threaded middle portion 66, and a lower tapered end 68. Ferrule 60 also has internal bore 61 that runs the length of the ferrule from inlet 62 to outlet 69. Preferably, internal bore 61 is narrower at the tapered end (as compared to the upper handle) of the ferrule so that while a capillary tube can readily fit into the narrower portion of the bore, the wall of the bore at the tapered end will collapse against the capillary tube as compressive forces are created as the ferrule is screwed into the thread tapered cavities of the first and second bodies of the microvalve. This effectively prevents the capillary tube from extruding during high pressure operations and forms a fluid seal. They can be fabricated by machining a single block of deformable material such as PEEK.

Figure 4:
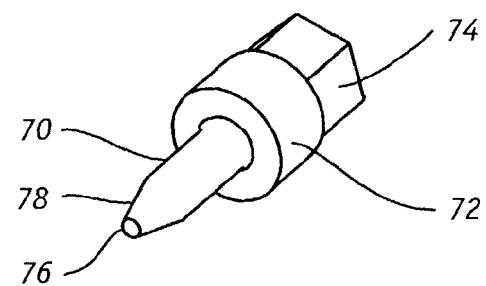
Figure 5:
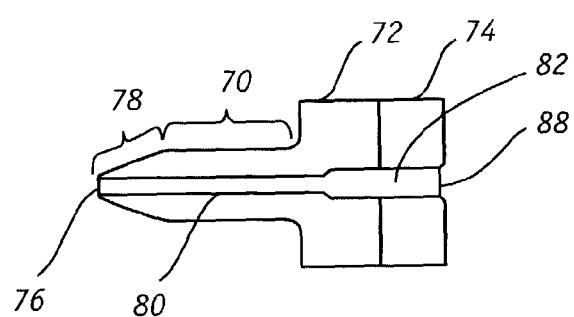

FIGS. 4 and 5 also depicts the threaded, one piece ferrule. The ferrule includes an adapter body 72 having an hexagonal nut 74 on one side and an elongated member 70,78 on the other side. End portion 78 of the elongated member is tapered. The ferrule has internal bore 80,82 that runs the length of the ferrule from inlet 88 to outlet 76. Preferably, as shown in FIG. 5, the proximal portion 82 of the bore is broader to facilitate insertion of a tube into the wider distal portion 80 of the bore. The wall of the bore at the tapered end will collapse directly against the tube as compressive forces are created as the ferrule is screwed into the threaded conical-shaped cavity. This effectively creates a liquid tight seal and prevents the capillary tube from extruding during high pressure operations. The ferrule is particularly suited for microfluidic applications and therefore is dimensioned accordingly. In this regard, the diameter of distal portion 80 of the bore is preferably 0.0145 in. (0.368 mm) to 0.15 (0.38 mm) and the diameter of the proximal portion 82 is typically 0.018 in. (0.46 mm) to 0.020 in. (0.51 mm).

Each ferrule is machined from a block of material to fabricate a single, integral piece ferrule. The bore is formed using conventional drills and threads are machined preferably on the exterior of the non-taper portion 70 of the elongated member. When using the ferrule, no flange is needed. In addition, a mating sleeve is not needed since the bore will collapse against the tube under compressive force. By "mating sleeve" is meant an extra tube that is inserted into the bore of the ferrule before the capillary tube that will be transferring a fluid of interest is inserted through the bore of the mating sleeve. Mating sleeves having an outer diameter that matches the inner diameter of prior art ferrules are used quite often but are not needed with the inventive ferrule. Because the ferrules are fabricated by machining, that is, they are not made by molding, a wide range of materials, including plastics, ceramics, and metals, for example, can be used depending on the expected operating conditions, e.g., temperature, pressure, and type of fluids the ferrule will be exposed to. The ferrules are reusable and can be finger-tightened to provide a good fluid-tight seal.

Typically one end of the capillary is preferably inserted into bore 61 of ferrule 60 until the end of the capillary tube reaches outlet 69 of the ferrule. The other end of the capillary is connected to a source of buffer, sample, waste reservoir, or chromatography device as the case may be.

Alternatively, rather than connecting the capillary tube to a remote source of materials for the substrate, the source can be a vial or similar container than can be attached directly to the upper handle 64 of ferrule 60.

The microvalve as illustrated in FIGS. 1 and 2 is particularly suited for use as a shut-off valve to control the flow through two capillaries 40 and 42. By rotating first body 12 so that the sealing ferrules and their associated capillaries are opposite the opposing sealing ferrule located in second body 14, the two capillaries are in fluid communication with each other to allow fluid, e.g, liquid and/or gas, to pass. Rotation away from that position shuts off that flow.

Alternatively, if one or both bodies have more than one cavity/ferrule then the microvalve can also function as a divert valve. For example, if the second body 14 of the microvalve as shown in FIGS. 1 and 2 has two cavities/ferrules, then flow from the capillary 40 can be diverted from one of the capillaries that is connected to the two ferrules of second body 14 to the other by rotating the first body to align sealing ferrules of the first body to one of the two sealing ferrules of the second body.

The microvalve is particularly suited for connecting capillary tubes to the microchannels or capillaries of a microscale analytic device. The invention is particularly suited for analysis operations that are desirably carried out on microscale devices and that require the application of high pressure. As used herein, "microfluidic" channel, or "microchannel" is a channel, e.g., sealed enclosed groove, depression, tube, capillary, which is adapted to handle small volumes of fluid. Typically, the channel is a tube or conduit having at least one subsection with at least one cross-sectional dimension of between about 0.1 microns and 500 microns, and typically less than 100 microns. The term "capillary" refers to a tube with a small internal diameter and for microfluidic applications, the capillary typically has an inner diameter that ranges from 1 microns to 250 microns and an outer diameter that ranges from 5 microns to 500 microns. The capillary is typically made of glass, metal, silica, or a polymer and are commercially available from a number of sources including, for example, Polymicro Technologies LLC (Phoenix, Ariz.).

Conventional mechanical pumps can be employed to deliver fluids through the capillaries; a preferred method employs a high pressure hydraulic system that has no moving parts for converting electric potential to hydraulic force and for manipulating fluids which are described in U.S. Pat. Nos. 6,013,164 to Paul, et al., 6,019,882 to Paul, et al., 6,224,728 to Oborny, et al. and 6,277,257 and 6,290,909 both to Paul, et al., which are all incorporated herein by reference.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A microvalve that comprises:

a first body having a first interior surface and at least one port outlet at the first interior surface that is in fluid communication with at least one first channel wherein each port outlet is surrounded by a first seal with an upper surface that is at a level above that of the first interior surface;

a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar; and means for aligning at least one port outlet in the first body to at least one port inlet in the second body to permit fluid flow from a first channel into a second channel and characterized in that the microvalve can be subjected to pressures of at least 500 psi without fluid leakage.

2. The microvalve of claim 1 wherein the first body defines a first hole, the second body defines a second hole that is concentric with the first hole and the first and second holes accommodate a fastener.

3. The microvalve of claim 2 wherein the fastener is selected from the group consisting of a bolt, spring loaded bolt, screw, spring loaded bolt, clamp, and electrically activated solenoid, and combinations thereof.

4. The microvalve of claim 1 wherein the first seal comprises an o-ring and the second seal comprises an o-ring.

5. The microvalve of claim 1 wherein each of the first body and second body is made of a material that is selected from the group consisting of polymer, ceramic and metal.

6. The microvalve of claim 5 wherein each of the first body and second body is made of a polymer that is selected from the group consisting of polyether ether ketone, high density polyethylene, and polytetrafluoroethylene.

7. The microvalve of claim 1 wherein each of the first body and second body is made of metal.

8. The microvalve of claim 1 wherein the first channel is a first capillary and the second channel is a second capillary.

9. The microvalve of claim 8 wherein the first capillary has an inner diameter from about 5 to 250 microns and the second capillary has an inner diameter from about 5 to 250 microns.

10. The microvalve of claim 1 wherein the first body includes at least one first cavity into which is placed at least one first ferrule each having a first bore that holds a first capillary and the second body includes at least one second cavity into which is placed at least one second ferrule each having a second bore that holds a second capillary.

11. The microvalve of claim 10 wherein the at least one first cavity is threaded and the at least one second cavity is threaded.

12. The microvalve of claim 11 wherein the at least one first cavity has a first tapered configuration and the at least one second cavity has a second tapered configuration.

13. The microvalve of claim 10 wherein the at least one first cavity has a first tapered configuration and the at least one second cavity has a second tapered configuration.

14. The microvalve of claim 10 wherein each ferrule is an integral structure.

15. The microvalve of claim 10 wherein each ferrule is made of a deformable material.

16. The microvalve of claim 10 wherein each ferrule comprises an upper handle, an externally threaded portion, and a lower tapered end and wherein the bore extends through the upper handle, externally threaded portion, and the lower tapered end.

17. The microvalve of claim 16 wherein each bore through the tapered end of the ferrule has a diameter that is narrower than that of the bore through the handle.

18. The microvalve of claim 10 wherein the at least one first cavity has a first tapered configuration and the at least one second cavity has a second tapered configuration.

19. The microvalve of claim 1 wherein the means for aligning the port outlet to port inlet comprises one or more pins located on either the first or second surfaces.

20. A method of controlling the flow of fluid from a first fluid stream into a second fluid stream that comprises the steps of:
   (a) providing a microvalve that comprises:
       (i) a first body having a first interior surface and at least one port outlet at the first interior surface that is in fluid communication with at least one first channel wherein each port outlet is surrounded by a first seal with an upper surface that is at a level above that of the first interior surface;
       (ii) a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar; and
       (iii) means for aligning at least one port outlet in the first body to at least one port inlet in the second body to permit fluid flow from a first channel into a second channel;
   (b) connecting a first channel to a port in the first body;
   (c) connecting a second channel to a port in the second body; and
   (d) maneuvering the aligning means to regulate fluid flow through the first and second channels and characterized in that the microvalve can be subjected to pressures of at least 500 psi without fluid leakage.

21. The method of claim 20 wherein step (d) comprises maneuvering the alignment means so that none of the at least one first channel is in fluid communication with any of the at least one second channel.

22. The method of claim 20 wherein step (d) comprises maneuvering the alignment means so that one or more of the at least one first channel is in fluid communication with one or more of the at least one second channel.

23. The method of claim 20 wherein the first body defines a first hole, the second body defines a second hole that can be rotationally aligned concentric with the first hole and the first and second holes accommodate a fastener.

24. The method of claim 23 wherein the fastener is selected from the group consisting of a bolt, spring loaded bolt, screw, spring loaded screw, clamp, electrically activated solenoid, and combination thereof.

25. The method of claim 20 wherein the first seal comprises an o-ring and the second seal comprises an o-ring.

26. The method of claim 20 wherein each of the first body and second body is made of a material that is selected from the group consisting of polymer, ceramic, and metal.

27. The method of claim 26 wherein each of the first body and second body is made of a polymer that is selected from the group consisting of polyether ether ketone, high density polyethylene, and polytetrafluoroethylene.

28. The method of claim 20 wherein each of the first body and second body is made of metal.

29. The method of claim 20 wherein the first channel is a first capillary and the second channel is a second capillary.

30. The method of claim 29 wherein the first capillary has an inner diameter from about 5 microns to 250 microns and the second capillary has an inner diameter from about 5 microns to 250 microns.

31. The method of claim 20 wherein the first body includes at least one first cavity into which is placed at least one first ferrule each having a first bore that holds a first capillary and the second body includes at least one second cavity into which is placed at least one second ferrule each having a second bore that holds a second capillary.

32. The method of claim 31 wherein at least one first cavity is threaded and the at least one second cavity is threaded.

33. The method of claim 32 wherein the at least one first cavity has a first tapered configuration and the at least one second cavity has a second tapered configuration.

34. The method of claim 31 wherein the at least one first cavity has a first tapered configuration and the at least one second cavity has a second tapered configuration.

35. The method of claim 31 wherein each ferrule is an integral structure.

36. The method of claim 31 wherein each ferrule is made of a deformable material.

37. The method of claim 31 wherein each ferrule comprises an upper handle, an externally threaded portion, and a lower tapered end and wherein the bore extends through the upper handle, externally threaded portion, and the lower tapered end.

38. The method of claim 37 wherein each bore through the tapered end of the ferrule has a diameter that is narrower than that of the bore through the handle.

39. The method of claim 31 wherein the at least one first cavity has a first tapered configuration and the at least one second cavity has a second tapered configuration.

40. The method of claim 20 wherein the means for aligning the port outlet to port inlet comprises one or more pins located on either the first or second surfaces.

41. A microvalve that comprises:
   a first body having a first interior surface and at least one port outlet at the first interior surface that is in fluid communication with at least one first channel wherein each port outlet is surrounded by a first seal with an upper surface that is at a level above that of the first interior surface;
   a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar and wherein the first seal comprises an o-ring and the second seal comprises an o-ring; and
   means for aligning at least one port outlet in the first body to at least one port inlet in the second body to permit fluid flow from a first channel into a second channel.

42. A microvalve that comprises:
   a first body having a first interior surface and at least one port outlet at the first interior surface that is in fluid communication with at least one first channel wherein each port outlet is surrounded by a first seal with an upper surface that is at a level above that of the first interior surface, wherein the first body includes at least one first cavity into which is placed at least one first ferrule each having a first bore that holds a first capillary;
   a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar and the second body includes at least one second cavity into which is placed at least one second ferrule each having a second bore that holds a second capillary; and means for aligning at least one port outlet in the first body to at least one port inlet in the second body to permit fluid flow from a first channel into a second channel.

43. A microvalve that comprises:

a first body having a first interior surface and at least one port outlet at the first interior surface that is in fluid communication with at least one first channel wherein each port outlet is surrounded by a first seal with an upper surface that is at a level above that of the first interior surface;

a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar; and means for aligning at least one port outlet in the first body to at least one port inlet in the second body to permit fluid flow from a first channel into a second channel wherein the means for aligning at least one port outlet to at least one port inlet comprises one or more pins located on either the first or second surface.

44. A method of controlling the flow of fluid from a first fluid stream into a second fluid stream that comprises the steps of:

(a) providing a microvalve that comprises:
  (i) a first body having a first interior surface and at least one port outlet at the first interior surface that is in fluid communication with at least one first channel wherein each port outlet is surrounded by a first seal with an upper surface that is at a level above that of the first interior surface;
  (ii) a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar, and wherein the first seal comprises an o-ring and the second seal comprises an o-ring; and
  (iii) means for aligning at least one port outlet in the first body to at least one port inlet in the second body to permit fluid flow from a first channel into a second channel;

(b) connecting a first channel to a port in the first body;
(c) connecting a second channel to a port in the second body; and
(d) maneuvering the aligning means to regulate fluid flow through the first and second channels.

45. A method of controlling the flow of fluid from a first fluid stream into a second fluid stream that comprises the steps of:

(a) providing a microvalve that comprises:
  (i) a first body having a first interior surface and at least one port outlet at the first interior surface that is in fluid communication with at least one first channel wherein each port outlet is surrounded by a first seal with an upper surface that is at a level above that of the first interior surface, wherein the first body includes at least one first cavity into which is placed at least one first ferrule each having a first bore that holds a first capillary;
  (ii) a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar and the second body includes at least one second cavity into which is placed at least one second ferrule each having a second bore that holds a second capillary; and
  (iii) means for aligning at least one port outlet in the first body to at least one port inlet in the second body to permit fluid flow from a first channel into a second channel;

(b) connecting a first channel to a port in the first body;
(c) connecting a second channel to a port in the second body; and
(d) maneuvering the aligning means to regulate fluid flow through the first and second channels.

46. A method of controlling the flow of fluid from a first fluid stream into a second fluid stream that comprises the steps of:

(a) providing a microvalve that comprises:
  (i) a first body having a first interior surface and at least one port outlet at the first interior surface that is in fluid communication with at least one first channel wherein each port outlet is sounded by a first seal with an upper surface that is at a level above that of the first interior surface;
  (ii) a second body having a second interior surface and at least one port inlet at the second interior surface that is in fluid communication with at least one second channel and wherein each port inlet is surrounded by a second seal with an upper surface that is at a level above that of the second interior surface and wherein the first interior surface is substantially planar and is slidably secured to the second interior surface which is also substantially planar; and
  (iii) means for aligning at least one first port outlet in the first body to at least one second port inlet in the second body to permit fluid flow from a first channel into a second channel;

(b) connecting a first channel to a port in the first body;
(c) connecting a second channel to a port in the second body; and
(d) maneuvering the aligning means to regulate fluid flow through the first and second channels wherein the means for aligning at least one port outlet to at least one port inlet comprises one or more pins located on either the first or second surfaces.

* * * * *